(12) United States Patent
Pierce et al.

(10) Patent No.: US 12,524,811 B1
(45) Date of Patent: Jan. 13, 2026

(54) TRANSACTION PROCESSING SYSTEM WHICH ENABLES UNCONSTRAINED DATA INPUTS TO A CONSTRAINED SYSTEM TO IMPROVE TRANSACTION PRECISION

(71) Applicant: Chicago Mercantile Exchange Inc., Chicago, IL (US)

(72) Inventors: Carrick John Pierce, New York, NY (US); Michael Copeland, Brooklyn, NY (US); John Joseph Wiesner, Aurora, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 101 days.

(21) Appl. No.: 18/541,746

(22) Filed: Dec. 15, 2023

(51) Int. Cl.
    *G06Q 40/04*  (2012.01)
(52) U.S. Cl.
    CPC ......... *G06Q 40/044* (2025.08); *G06Q 40/045* (2025.08)
(58) Field of Classification Search
    CPC ..... G06Q 40/04; G06Q 40/044; G06Q 40/045
    USPC ........................................................ 705/37
    See application file for complete search history.

(56) References Cited

U.S. PATENT DOCUMENTS

| | | | |
|---|---|---|---|
| 6,016,483 | A  | 1/2000 | Rickard |
| 6,766,304 | B2 | 7/2004 | Kemp, II et al. |
| 6,772,132 | B1 | 8/2004 | Kemp, II et al. |
| 7,212,997 | B1 | 5/2007 | Pine |
| 7,831,491 | B2 | 11/2010 | Newell et al. |
| 7,853,499 | B2 | 12/2010 | Czupek et al. |
| 7,877,316 | B2 | 1/2011 | Adcock |
| 7,890,417 | B2 | 2/2011 | Hanson et al. |

(Continued)

FOREIGN PATENT DOCUMENTS

| WO | 0227606 A2 | 4/2002 |
|---|---|---|
| WO | 2004040422 A2 | 5/2004 |

(Continued)

OTHER PUBLICATIONS

"Block Trade Fundamentals", FIA, 3 pages, available as early as Feb. 15, 2021.

(Continued)

*Primary Examiner* — Lindsay M Maguire
(74) *Attorney, Agent, or Firm* — Lempia Summerfield Katz LLC

(57) ABSTRACT

The disclosed embodiments relate to automatically enabling unconstrained inputs of data, e.g., related to quantities of a proposed trade order for submission to an electronic trading system from parties in an electronic data transaction system that enforces constraints, e.g., a maximum precision in specified quantities, on the inputs relating to the proposed trades that can be submitted by the counterparties. The disclosed embodiments relate to a user interface and system that enables a participant to specify quantities for trades with an increased precision, e.g., fractional quantities, enabling more precise alignment of the transactional characteristics with the specific goals of the participant, in an electronic trading system which constrains tradeable quantities to a maximum allowable precision, e.g., such as whole number quantities, based on business and/or regulatory requirements, e.g., requirements which dictate, for example, that transactions may only take place in whole number quantities or units.

20 Claims, 4 Drawing Sheets

(56) References Cited

U.S. PATENT DOCUMENTS

| | | |
|---|---|---|
| 7,966,249 B1 | 6/2011 | Dawson |
| 8,200,569 B1 | 6/2012 | Zerenner et al. |
| 8,275,635 B2 | 9/2012 | Stivoric |
| 8,380,612 B2 | 2/2013 | Hanson |
| 8,392,319 B2 | 3/2013 | Hansen |
| 8,630,937 B1 | 1/2014 | Zerenner et al. |
| 8,732,048 B2 | 5/2014 | Marynowski |
| 10,430,884 B2 | 10/2019 | Lee |
| 10,475,123 B2 | 11/2019 | Bawadhankar |
| 11,354,741 B1 | 6/2022 | Stevens |
| 2003/0110107 A1 | 6/2003 | Hiatt et al. |
| 2003/0115128 A1 | 6/2003 | Lange et al. |
| 2005/0096999 A1 | 5/2005 | Newell et al. |
| 2006/0036531 A1 | 2/2006 | Jackson et al. |
| 2006/0282369 A1* | 12/2006 | White .................. G06Q 40/04 705/37 |
| 2007/0162373 A1 | 7/2007 | Kongtcheu |
| 2007/0192232 A1* | 8/2007 | Czupek ................ G06Q 40/04 705/37 |
| 2008/0016010 A1 | 1/2008 | Nanjundamoorthy et al. |
| 2010/0036763 A1* | 2/2010 | Driscoll ............... G06Q 40/00 705/37 |
| 2011/0078065 A1 | 3/2011 | Wingerden |
| 2011/0270728 A1 | 11/2011 | Connors |
| 2012/0041891 A1 | 2/2012 | Babel et al. |
| 2014/0006243 A1 | 1/2014 | Boudreault et al. |
| 2014/0019327 A1* | 1/2014 | Lutnick ................ G06Q 40/04 705/37 |
| 2014/0089161 A1 | 3/2014 | Robbins |
| 2015/0127516 A1 | 5/2015 | Studnitzer et al. |
| 2015/0161727 A1 | 6/2015 | Callaway |
| 2016/0300304 A1 | 10/2016 | Feret |
| 2017/0046783 A1 | 2/2017 | Hosman |
| 2017/0103462 A1 | 4/2017 | Peck-walden |
| 2017/0331774 A1 | 11/2017 | Peck-walden |
| 2020/0394710 A1 | 12/2020 | Konduru |

FOREIGN PATENT DOCUMENTS

| | | |
|---|---|---|
| WO | 2008095140 A1 | 8/2008 |
| WO | 2011049936 A2 | 4/2011 |

OTHER PUBLICATIONS

"Block Trade", Wikipedia, 2 pages, Jul. 3, 2020.
"ICE Futures Europe Block Trades and Asset Allocations", ICE Futures Europe, Sep. 2020, 19 pages.
"Understanding Block Trades", CME Group, Nov. 1, 2017, 5 pages.
CME Group, "Block Trades—What is a Block Trade"? 1 page, 2021.
CME Group, "Block Trades", 2 pages, 2021.
Federal Register/vol. 86, No. 66 (Year: 2021).
Guyomard et al.: Producer Behavior under Strict Rationing and Quasi-Fixed Factors, Jul. 1993, University of Minnesota, pp. 1-31. (Year: 1993).
ICE Futures U.S., Block Trade—FAQs, Dec. 1, 2020, 16 pages.
ICE Futures U.S., Block Trade FAQs, Mar. 13, 2008, 8 pages.
ICE Swap Trade, LLC, Block Trade—FAQs, Dec. 2017, 4 pages.
Investopedia—Synthetic Definition (Year: 2021).
ISDA: Block Trade reporting for over-the-counter derivatives markets, Jan. 18, 2011, pp. 1-37 (Year: 2011).
James Chen, "What is a Block Trade", Investopedia, Oct. 1, 2020, https://www.investopedia.com/terms/b/blocktrade.asp.
Journal of Service Management (JaSM): Platform in the peer-to-peer sharing economy, Nov. 29, 2018, vol. 30, No. 4, pp. 452-483 (Year: 2018).
Nasdaq Options 3 Options Trading Rules (Year: 2019).
theice.com: ICE Swap Trade, Apr. 2016, pp. 1-4, (Year: 2016).
Turvey, Michael: Advanced Stock arder Types to Fine-Tune Your Market Trades, Jan. 8, 2020, Ticker Tape, Ameritrade, pp. 1-5 (Year: 2020).

* cited by examiner

TRANSACTION PROCESSING SYSTEM WHICH ENABLES UNCONSTRAINED DATA INPUTS TO A CONSTRAINED SYSTEM TO IMPROVE TRANSACTION PRECISION

BACKGROUND

Electronic data processing systems, such as electronic transaction processing systems and electronic trading systems, often, as function of convenience and/or necessity, place constraints on the data which may be provided as inputs thereto, such as type of data, e.g. numeric vs. text, the size of the data, e.g., the number of digits, characters or bytes, the number of decimal places, e.g., the precision, minimum/maximum value, minimum/maximum change in value, as well as other limitations. For example, some systems may limit certain inputs to whole numbers only, thereby excluding the input of fractional values. Such constraints may be in the form of assertions about the desired properties of the data and/or the desired relationship among a set of data.

As a matter of convenience, such constraints may simplify the implementation, e.g., the programming, of the electronic transaction processing system, and/or allow the system to be implemented with fewer or less costly resources, e.g., using lower capability processors, less memory and/or less data storage. As a matter of necessity, allowing unconstrained inputs may make an electronic transaction processing system cumbersome or otherwise impractical to implement or use. For example, in systems which compare two separate inputs to determine a match, if those inputs are constrained to a limited set of values, the system may need to perform fewer comparison operations to determine a match, i.e., less input variability results in higher likelihood two inputs will match. In another example, the use of constraints may simplify the construction and maintenance of user interfaces, data structures, computational components, etc. of the electronic data processing systems.

In some situations, while constraining inputs may benefit some aspects or uses of the electronic transaction processing system, these same constraints may also unduly restrict other aspects thereof. For example, by restricting the precision with which inputs may be provided to the system, the precision of the output, and therefore the utility thereof, may be limited.

However, in mature transaction processing systems, designed at the outset with such constraints built in, loosening those constraints so as to provide for increased operational precision without rebuilding the system may present technical challenges.

DETAILED DESCRIPTION

Figure 1:
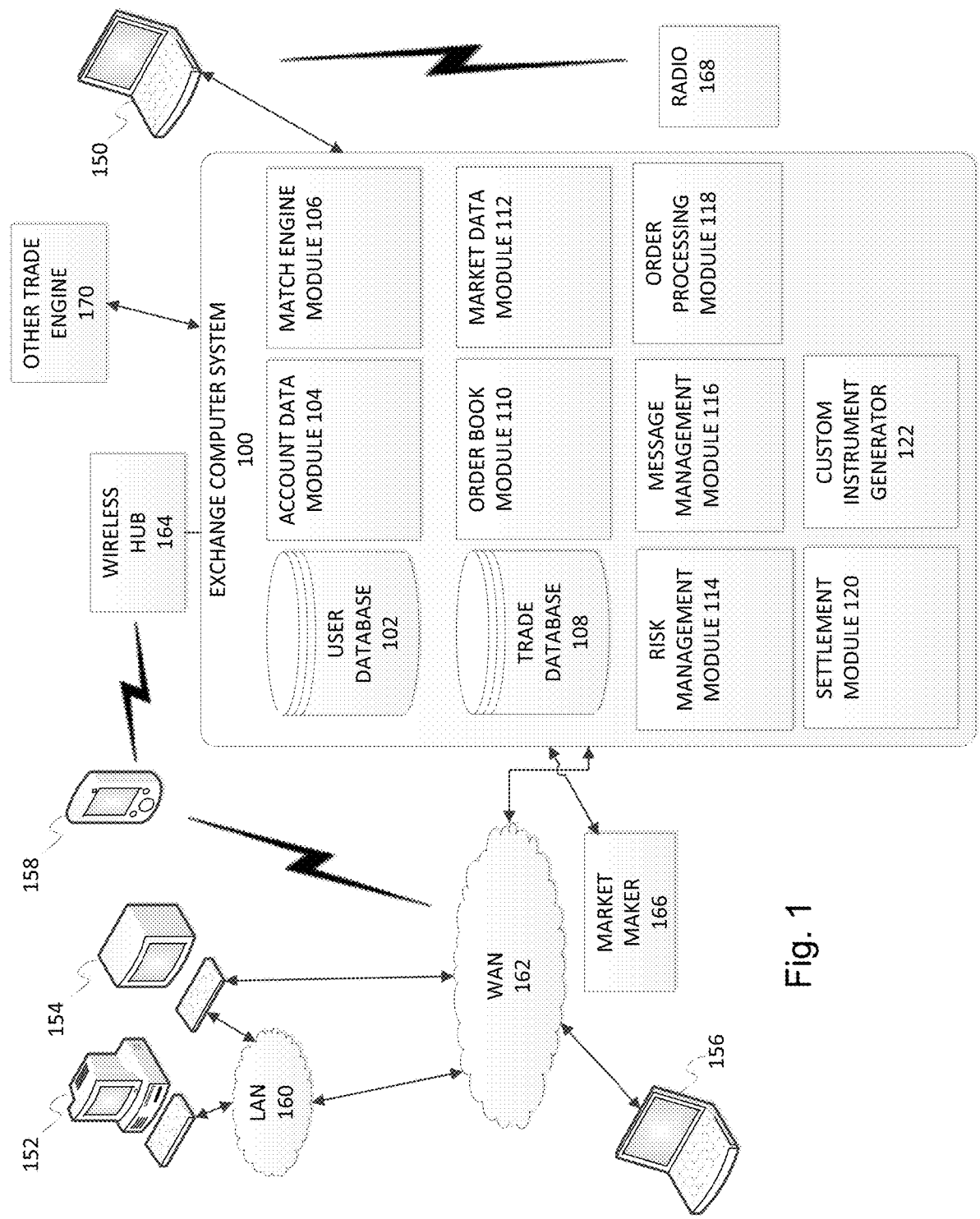
FIG. 1 depicts a computer network system, according to some embodiments.

The disclosed embodiments relate to a system and a method for automatically enabling unconstrained inputs of data, e.g., inputs that relate to quantities of a proposed trade order for submission to an electronic trading system, e.g., which specify a quantity and a price for a financial product, from parties in an electronic data transaction system, e.g., an electronic trading system, that enforces constraints, e.g., a maximum precision in specified quantities for financial products, on the inputs relating to the proposed trades that can be submitted by the counterparties.

In particular, the disclosed embodiments relate to a user interface and system that enables a participant to specify quantities for trades with an increased precision, e.g., fractional quantities, enabling more precise alignment of the transactional characteristics with the specific goals of the participant, in an electronic trading system which constrains tradeable quantities to a maximum allowable precision, e.g., such as whole number quantities, based on business and/or regulatory requirements, e.g., requirements which dictate, for example, that transactions may only take place in whole number quantities or units.

More particularly, with respect to the electronic trading of futures contracts, a futures contract provides a mechanism to buy or sell a particular commodity or asset (an underlying asset or underlier) at a predetermined price at a specified time in the future via electronic central counterparty, i.e., an electronic trading system. In contrast to over the counter instruments, which may be entirely customized by the parties thereto, futures contracts, as well as other exchange traded instruments, such as swaps, are standardized, specifying many of the contract conditions, e.g., particular terms such as quantity of the underlier, settlement date, or the underlying asset, and they are therefore referred to/considered standardized contracts.

Typically, the terms and conditions of each futures or options contract are standardized as to the specification of the contract's underlying reference commodity, the composition of the commodity, quantity, delivery date, and means of contract settlement. Such standardization may improve the liquidity of these contracts, e.g., the ease with which such contracts may be bought or sold. Terms and conditions of each futures contract may be partially standardized as to the specification of the contract's underlying reference commodity and attributes thereof. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Futures contracts may be settled either with physical deliver, i.e., the actual underlier is effectively delivered from the seller to the buyer, or via cash settlement. Cash settlement is a method of settling a futures contract whereby the parties effect final settlement, when the contract expires, by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts, and other derivatives.

Further, as the quantity of the underlier of a futures contract is standardized, e.g., each futures contract is for the delivery of a predefined number of units, if a user desires a larger quantity, they must purchase multiples of that futures contract. However, as electronic trading systems are typically configured to constrain transactions to whole number quantities of futures contracts, it is not possible to obtain quantities of the underlier in amounts which are not aligned with a multiple of the standardized quantity of a single contract. For example, where the standard quantity of one contract is 100 units, it would not be possible for a user to obtain a position in 150 units. While some electronic trading systems have begun to offer more granular futures contracts, sometimes referred to as mini or micro contracts, these contracts are still constrained to a defined minimum quantity of the underlier, such as 5 or 10 units. Accordingly, it would still not be possible, for example, for a user to enter into a position for 151 units.

For example, trading baskets of products in defined ratios, organized as "Programs," and traded on "Programs Desks" at money center banks, are central strategies in financial services. The most frequently engaged use cases are in accumulating, reducing, or hedging large portfolios of stocks by asset managers and hedge funds.

A persistent challenge in executing these programs is the market impact that their execution can induce, given that the size of any program may exceed the average daily volumes (ADVs) of its component securities. Multiple ways to address this challenge have evolved, such as the use of trading algorithms ("algos"), which can opportunistically time executions to minimize market impact. Another popular method involves assembling a proxy portfolio made up of fewer, but more liquid securities. It is then easier for the asset manager to work into and out of this proxy portfolio to achieve optimal prices, while the underlying securities are exchanged more slowly.

The underpinning requirement of any proxy portfolio is that it should be highly correlated with the actual portfolio that it is attempting to replicate. Some potential statistical techniques for determining a proxy portfolio include covariance matrices, and principal component analysis (PCA). PCA is one method that can be used to distill a large, multi-factor portfolio to a smaller number of fundamental drivers that ultimately explain the portfolio's returns.

A hypothetical example of a PCA result (shown in Table 2) on a target portfolio (shown in Table 1) could look like the following:

TABLE 1

Sample Target Portfolio

| Stock Name | Ticker | Qty |
| --- | --- | --- |
| Accenture PLC Class A | ACN | 33,690 |
| Adobe Inc | ADBE | 13,699 |
| Advanced Micro Devices Inc | AMD | 45,841 |
| Apple Inc | AAPL | 44,215 |
| Bank of America Corp | BAC | 28,183 |
| BlackRock Inc | BLK | 16,971 |
| Broadcom Inc | AVGO | 21,677 |
| Chevron Corp | CVX | 13,497 |
| Cisco Systems Inc | CSCO | 42,635 |
| ConocoPhillips | COP | 13,295 |
| EOG Resources Inc | EOG | 28,011 |
| Exxon Mobil Corp | XOM | 41,363 |
| JPMorgan Chase & Co | JPM | 42,843 |
| Marathon Petroleum Corp | MPC | 11,318 |
| Mastercard Inc Class A | MA | 16,963 |
| Microsoft Corp | MSFT | 41,467 |
| Morgan Stanley | MS | 24,318 |
| NVIDIA Corp | NVDA | 22,394 |
| Oracle Corp | ORCL | 19,186 |
| Phillips 66 | PSX | 16,957 |
| Pioneer Natural Resources Co | PXD | 18,982 |
| S&P Global Inc | SPGI | 32,853 |
| Salesforce Inc | CRM | 33,813 |
| SLB | SLB | 16,194 |
| The Goldman Sachs Group | GS | 26,522 |

TABLE 1-continued

Sample Target Portfolio

| Stock Name | Ticker | Qty |
| --- | --- | --- |
| Valero Energy Corp | VLO | 33,249 |
| Visa Inc Class A | V | 28,550 |
| Wells Fargo & Co | WFC | 16,612 |

TABLE 2

Sample PCA Portfolio derived from the target portfolio of Table 1

| Security Name | Ticker | % Weight |
| --- | --- | --- |
| SPDR S&P 500 ETF | SPY | 47.2% |
| Invesco QQQ Trust | QQQ | 18.4% |
| Energy Select Sector SPDR | XLE | 15.9% |
| US Oil Fund | USO | 11.7% |
| Unexplained | | 6.8% |

From the above, a portfolio of close to 30 securities (stocks) may be reduced to a proxy hedge portfolio of four securities (ETFs) using PCA. The basket of four ETFs may be much easier to trade quickly and in large size than the complete portfolio would be. In real implementations of this technique, portfolios of hundreds, even thousands of stocks are "proxy traded" using these hedge baskets.

Considering the market for futures contracts, such as that offered by the Chicago Mercantile Exchange Inc. (CME), futures contracts are often leveraged for this purpose, providing a very efficient, liquid vehicle to establish prices in the general market before trading into or out of specific securities. One challenge is that the futures contracts offered by exchanges are often utilized in this process in a more generalized, broad approach, which doesn't always produce the most correlated proxy performance that user may need. For example, practitioners may use CME Group's E-mini S&P 500 futures, which are $\frac{1}{10}$ the size of the regular S&P 500 futures, or Nasdaq 100 futures, or a variety of other commodity or sector futures, which accomplish certain use cases with less precise results. This is due to the standardized underlier size of these contracts which must be traded in whole number quantities which necessarily restricts the precision with which the contracts can be assembled into a replicated/proxy portfolio.

In some embodiments, an array of products can be used to create near-perfect proxy portfolios. Many major businesses either produce the products CME's offered futures represent or use them as inputs to produce other products. Companies in the oil industry, for example, may borrow money to explore for crude oil and natural gas, redistribute those products directly, or refine them into other products, such as gasoline or heating oil. The performance of the stocks of these entities, for example, might be closely replicated by trading a basket of Treasury Futures, WTI Crude Oil Futures, Natural Gas Futures, and E-mini S&P 500 futures. Similarly, an agricultural equipment manufacturing company may borrow money to finance the manufacture of farm equipment which uses steel and aluminum as inputs, and demand for which is driven by crop yield growth. The stock in this entity might be replicated by trading a basket of Corn Futures, Steel Futures, Treasury Futures and E-mini S&P 500 Futures.

Significantly larger and more complex portfolios can be replicated by evaluating and selecting an optimal basket of futures with respective weights, theoretically by which any portfolio of equities, bonds, and/or other instruments, could be approximated. For example, the replicating portfolio described in Table 2 may optionally be replaced by the proposed portfolio shown in Table 3:

TABLE 3

Proposal

| Security Name | Ticker | % Weight |
|---|---|---|
| E-mini S&P 500 Future ES | ES | 43.4% |
| E-mini Nasdaq 100 Future | NQ | 19.2% |
| WTI Crude Oil Future | CL | 20.1% |
| Natural Gas Future | NG | 15.3% |
| Unexplained | | 2.0% |

The disclosed embodiments relate to a system/process for instantaneously creating a user-defined tradable future contract (UDF) that delivers into a basket of active futures in pre-specified ratios. That is, the UDF comprises an underlier that is a customized set of actively traded futures contracts in specified ratios, e.g., the underlier may comprise 14.4% of futures contract 1, 28.9% of futures contract 2, 40% of futures contract 3, and 16.7% of futures contract 4. This allows a user, such as a trader, to define a proxy hedge to one or more securities portfolios, as in the examples above, and then trade a single future that represents a basket of component futures that comprises the user's replicating portfolio. Notably, the disclosed embodiments enable unconstrained precision in specifying the component contract ratios regardless of whether those ratios result in a non-whole number quantity of the underlying futures contracts. This enables the creation of a replicating portfolio which more precisely meets the requirements of the user, i.e., more closely correlates with the portfolio to be replicated.

In one embodiment, the system/process may operate as follows:

1) User may perform a statistical analysis to determine an optimal mix of available futures contracts and their weights. In one example, the user may use PCA to replicate a desired portfolio.

2) User enters an array of futures contract codes and their respective weights into an interface provided by the disclosed embodiments, such as the Globex UDF facility provided by CME. The input would be of a similar form as shown in Table 3—with weights being enforced to sum to 1 (100%). It will be appreciated that the precision, i.e., number of permitted decimal places, may be implementation dependent, and values less than one may be permitted.

TABLE 4

| Future | Weight |
|---|---|
| ESU3 | 44.3% |
| NQU3 | 19.6% |
| CLV3 | 20.5% |
| NGV3 | 15.6% |

3) The Globex and UDF calculation engine would instantiate a tradable future from the inputs, including making all the necessary database entries.

4) As this is an official listed, tradable Globex instrument, as part of the creation process, an electronic Request-For-Quote (RFQ), described in more detail below, may multiplex into the Globex environment. Note, the Globex message format structure would include all necessary information about the UDF, including which active futures contracts were included, and their respective weights. This can enable users and other API connected participants to read in the message and have mathematically consistent pricing responses. A RFQ is an electronic notification sent, for example, to all Globex, or other electronic trading system participants that expresses interest in a specific strategy or instrument and solicits electronic responses therefrom relating to the responder's counter-interest therein.

5) Connected and eligible market makers can respond to the UDF RFQ with two-sided markets. Because there can be an implied price (the sum of the component futures adjusted by their weights), there are natural arbitrage boundaries. As an extension, the UDF mechanism could also leverage Globex implication to ensure a two-side market.

6) Once a two-sided market is present, the initiating user can trade by entering a basic Globex marketable order. In doing so, a user would specify the number of UDF futures to trade. Note here, that all calculations for the UDF basket may be in terms of notional dollars.

TABLE 5

| Px | Contract Size | Notional |
|---|---|---|
| $4,405.00 | 50 | $220,250.00 |
| $14,865.00 | 20 | $297,300.00 |
| $81.12 | 1000 | $81,120.00 |
| $2.76 | 10000 | $27,600.00 |

If an order was placed for $10 mm notional, the basket components would be multiplied out to adjust for contract size and then re-normalized to achieve the proportions of the basket. For example, on a $10 mm notional UDF trade, the number of contracts for the components would be the following:

| Future | Raw | Deliverable |
|---|---|---|
| ESU3 | 20.10702 | 20 |
| NQU3 | 6.589922 | 6 |
| CLV3 | 25.28378 | 25 |
| NGV3 | 56.5661 | 56 |

Note, as described above, the UDF cannot deliver partial contracts on expiration, so, according to the disclosed embodiments, a mechanism for hybrid physical and cash settlement is provided. Using this hybrid implementation, the contract can trade as the raw quantities but deliver the lower rounded contract quantities on expiration. A cash settlement to true up the balance from the partial contracts can also be exchanged on expiration.

7) The UDF contract, in one implementation, can expire one business day prior to the nearest contract deliverable in the basket. Using the above example, expiration would be Sep. 14, 2023:

| Future | Expiry |
|---|---|
| ESU3 | 15 Sep. 2023 |
| NQU3 | 15 Sep. 2023 |
| CLV3 | 20 Sep. 2023 |
| NGV3 | 27 Sep. 2023 |

Being a future itself, the UDF could be traded as easily as any other Globex product. The weights need not change during the life of the contract through expiration. In an alternative embodiment, a product variant comprising an "American" exercise UDF may be created, where a user can perform an 'Exchange For Physical' (EFP), which involves an election to convert the UDF into the basket of individual futures prior to expiration. Additional embodiments, some of which incorporate this feature, also exist.

In another example, a user may create a 'User Defined Instrument' (UDI). A UDI is designed to allow a user to list an individual option that is currently not being quoted, but that is in the strike listing rule (product rule filing). This capability is only able to instantiate a single option or pre-defined instrument that can be listed—i.e., there is no concept/ability for defining characteristics of the instrument itself that can be variable.

In addition to enabling increased precision, the disclosed UDF also provides messaging efficiency gains. Ordinarily, a basket of futures in the described ratios would need to be quoted and traded as separate futures, requiring separate exchanges of electronic messages to quote and trade each basket component. A UDF instead allows for an n-many collection of futures, or even in a broadly generalized version, an n-many collection of tradable instruments. Reducing the basket to a single tradable contract also reduces the associated Globex messaging burden and optimizes quoting and market data dissemination efficiency. In addition, being able to create and trade a multi-instrument basket further eliminates latency, i.e., leg risk, between the submission of separate trade orders for each component during which markets for those instruments may unfavorably change.

Accordingly, the disclosed embodiments, utilizing a hybrid physical/cash settlement, provide a technical mechanism which enables an electronic trading system to allow a user to acquire a set of one or more futures contracts in precise quantities, including fractional amounts, without having to fractionalize positions in the actual underlying futures contracts. Among other advantages, the disclosed embodiments enable creation of proxy portfolios which precisely correlate with a desired target portfolio without modifying the underlying components of the proxy portfolios. Additionally, the disclosed embodiments enable unit transactions in these sets of contracts, reducing the computational and communications resources necessary to engage in transactions therein, e.g., to quote or otherwise place electronic trade orders therefore.

The implementation of a user interface that allows users to input data that is not constrained by the electronic data processing systems, coupled with a hybrid process by which the customized instruments are settled and standardized instruments are delivered, is a technical implementation to solve problems therewith, such as restrictions on the granularity/precision of the parameters that a user can input when the parameters do not follow the system input constraints, which may be based on rules and regulations imposed by, or technical limitations of, the electronic data processing systems. For example, the disclosed embodiments may enable increased precision in specifying combinations of tradable instruments to precisely replicate characteristics of a target portfolio, and further enable delivery thereof without having to modify the underlying instruments. As such, the disclosed embodiments provide technical solutions to these technical problems.

The disclosed embodiments provide an improved electronic data transaction system that provides greater accessibility and standardization for all participants and therefore provide a specific and practical application which improves upon prior electronic data transaction systems and provides additional functionality not previously provided. For example, the disclosed embodiments enable unconstrained data values to be used with a system having constrained inputs, e.g., the disclosed embodiments enable specification of quantities with increased precision not otherwise available, whilst avoiding modification of the underlying instruments to enable fractional delivery thereof. The disclosed embodiments may use a system of hybrid physical/cash settlement to enable transactions in sets of fractional quantities of instruments.

The disclosed embodiments solve problems which uniquely arise in the fields of computer technology and electronic data transaction processing systems. Thus, the disclosed embodiments are rooted in computer technology in order to overcome problems specifically arising in electronic data transaction systems. Indeed, the subject technology improves the functioning of the electronic data transaction processing system by enabling the user to enter inputs that are not constrained without having to modify the electronic data transaction processing system and by improving the efficiency and precision of transacting in sets of instruments designed to replicate other portfolios. Furthermore, using the disclosed embodiments, transactions in these sets of instruments may be performed more efficiently, i.e., consuming less computational and/or communications resources, using unit transactions on the set, as opposed to individual transactions for each of the constituents thereof.

The disclosed embodiments may be implemented in association with a data transaction processing system that processes data items or objects, such as an exchange computing system which implements electronic trading, also referred to as an electronic trading system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity/amount of a product at a specified price. Products, e.g., financial instruments, or order books representing the state of an electronic marketplace for a product, may be represented as data objects or data structures within the exchange computing system. The instructions may also be conditional, e.g., buy or sell a quantity of a product at a given value if a trade for the product is executed at some other reference value.

While the disclosed embodiments may be described with respect to electronic data transaction request and result messages, it will be appreciated that the disclosed embodiments may be implemented with respect to other technologies or messaging mechanisms later developed.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets. The clearing house may implement the FEC system described above utilizing the disclosed embodiments in concert with the above described Clearing Message Broker ("CMB").

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed overnight on GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature, such as clearing firm or clearing entity, reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods, including the functions of the clearing house described above, is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
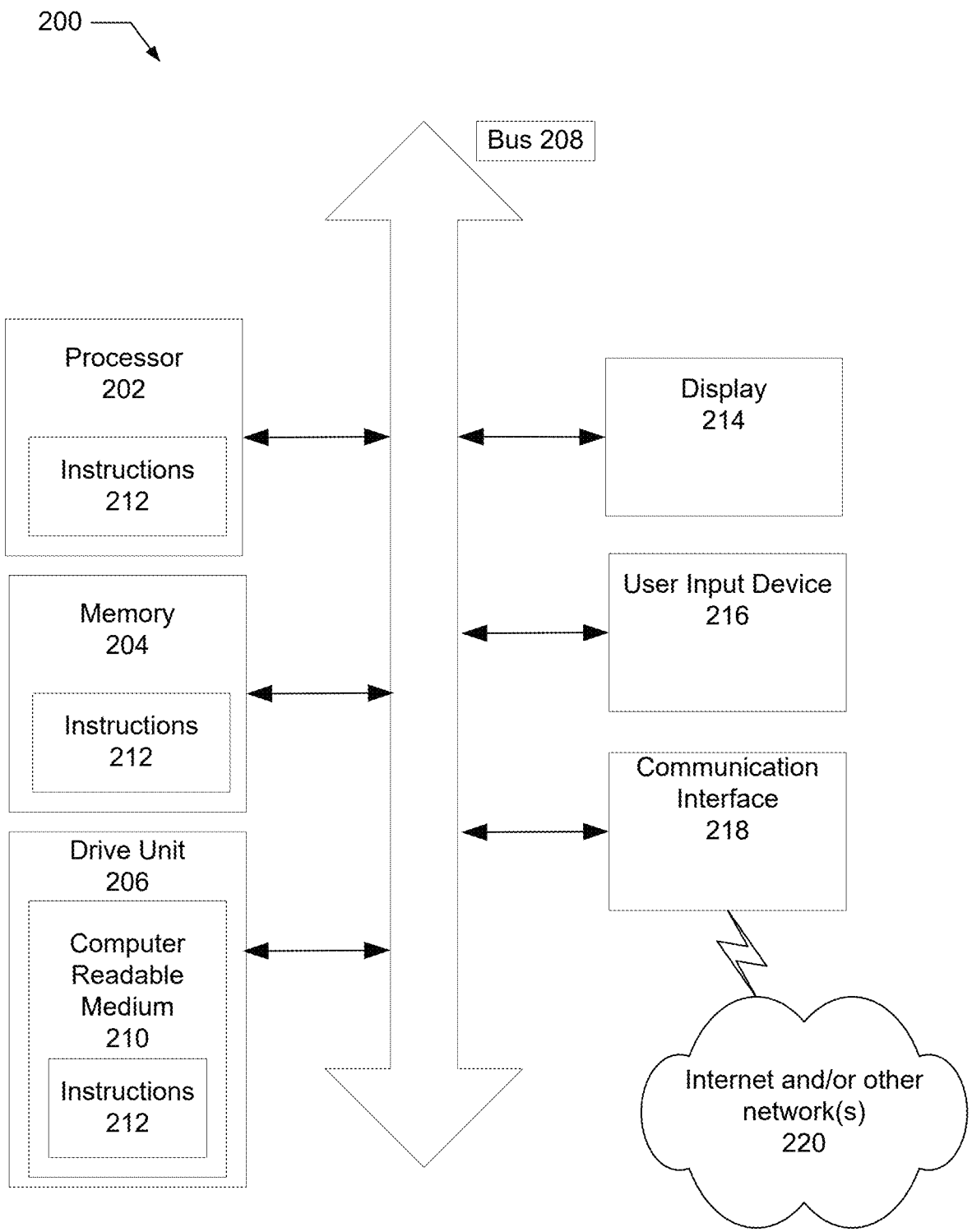
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, usernames and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled order that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

A custom instrument generator module 122, shown in more detail in FIG. 3 described in more detail below, may be included to, using the disclosed embodiments, implement the disclosed system/process for enabling unconstrained, i.e., increased precision data inputs to the exchange computing system 100. The module 122 may generate and provide a user interface to client devices, such as client devices 150-158, which enables entry of a tradeable instrument, e.g., a futures contract, having as an underlier thereof, a custom specification of a set of available instruments in customized proportions as described herein. Once received, the module 122 may be configured to make the instrument tradable, such as by communicating it to the order book module 110 or other module of the system 100. The module 122 may further communicate the instrument to an RFQ module (not shown) in order to solicit quotes for the instrument from other participants. Once tradable, participants, including the participant which initiated the creation of the instrument, may submit electronic trade orders to transact the instrument. Upon expiration thereof, the module 122, such as via the settlement module 120, may settle the instrument by delivering whole number quantities of the underlying instruments to the participating users while settling any fractional quantities thereof via one of crediting or debiting appropriate cash amounts to the participants' accounts such as via the risk management module 114, e.g., via the crediting or debiting of the margin accounts thereof. The module 122 may be coupled with the order book 110, order processing 118, settlement 120 and/or risk management 114 modules so as to be able to implement settlement and/or margin of the custom instrument as described herein. In alternative embodiments, the functionality of the module 122 may be incorporated into one or more of the order book 110, order processing 118, settlement 120 and/or risk management 114 modules, or other modules described herein.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade, clearing or other information therewith, such as by using messaging via the messaging module 116. It should be appreciated that the types of computer devices deployed by users and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based compute device, or other wireless device, may communicate with the LAN 160 and/or the Internet 162 via radio waves, such as via Wifi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include shared or proprietary distributed processing, e.g., a cloud/shared host based implementation, component/object distributed processing, and parallel processing. Alternatively, virtual computer system processing, e.g., using proprietary and/or cloud/shared host based implementations, can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Custom Instrument Generator Module

Figure 3:
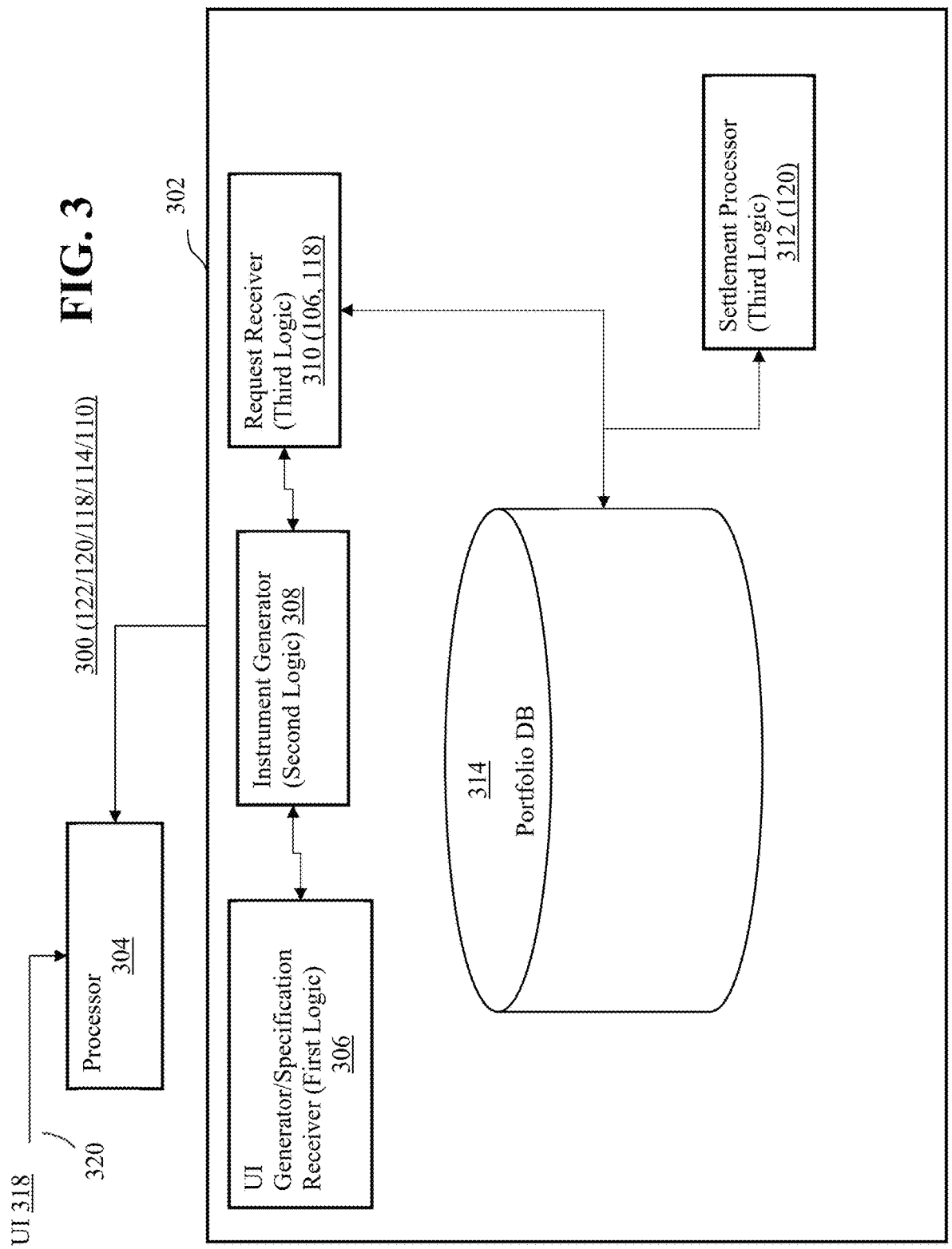
FIG. 3 depicts a block diagram of a system for enabling unconstrained data inputs to a constrained system to improve transaction precision.

FIG. 3 depicts a more detailed block diagram of the custom instrument generator module 122 of FIG. 1 illustrating a system 300 shown in FIG. 3 for automatically enabling unconstrained data inputs to an electronic trading system having constrained data inputs so as to improve transaction precision. The system 300 may also referred to as a component, intermediary, or architecture, and may be implemented as a separate component or as one or more logic components, such as part of one more of the modules of the exchange computing system 100 described above, such as on an FPGA that may include a memory or reconfigurable component to store logic and processing component to execute the stored logic, or as computer program logic, stored in a memory 302, or other non-transitory computer readable medium, and executable by a processor 304, such as the processor 202 and memory 204 described above with respect to FIG. 2.

The system 300 includes a user interface generator 306, which may be implemented as first logic or other computer executable program code 306 stored in the memory 302 and configured to be executed by the processor 304, or otherwise operative to cause electronic presentation, via an electronic communications network 320, such as the network 220 of FIG. 2, of a user interface on a display of a client device, such as client devices 150-158 of FIG. 1, coupled with a network, the user interface configured to receive, from a participant via the client device, a specification of a set of financial instruments, the specification identifying a proportional quantity of each financial instrument of the set relative to the other financial instruments of the set, at least one of the proportional quantities comprising other than a whole number value, e.g., a fractional value. The specification may further specify a side, e.g., buy or sell, for each instrument of the set.

The system 300 further includes an instrument generator 308 coupled with the user interface generator 306, which may be implemented as second logic or other computer executable program code 308 stored in the memory 302 and configured to be executed by the processor 304, or otherwise operative to generate a single financial instrument comprising an obligation to deliver, upon settlement, a position in each of the set of financial instruments, and enable trading thereof in an electronic trading system, the single financial instrument specifying an expiration date upon which the electronic trading system will settle the single financial instrument.

The system 300 further includes a request receiver 310 coupled with the instrument generator and the portfolio database 314, which may be implemented as third logic or other computer executable program code 310 stored in the memory 302 and configured to be executed by the processor 304, or otherwise operative to receive, from the participant/client device, a single electronic request message comprising an order for a quantity of the single financial instrument and, based thereon, match, such as via the match engine module 106, the received order with a previously received order counter thereto received from another participant, generate, based thereon, at least a position in the single financial instrument in association with the participant, and store, in a portfolio database 314 coupled with the request receiver, data indicative of the generated position.

The system 300 further includes a settlement processor 312, such as the settlement processor 120, coupled with the portfolio database 314, which may be implemented as fourth logic or other computer executable program code 312 stored in the memory 302 and configured to be executed by the processor 304, or otherwise operative to determine that the expiration date of the single financial instrument has occurred and, based thereon, create positions in association with the participant for a whole number quantity of each of the financial instruments of the set of financial instruments in accordance with the specification and the quantity of the single financial instrument, and based on the at least one of the proportional quantities comprising other than a whole number value and the quantity of the single financial instrument, one of credit or debit an account of the participant an amount based a fractional remainder of the at least one of the proportional quantities comprising other than a whole number value after creation of the position in the whole number quantity of the financial instrument associated therewith.

The system 300 may be implemented as one or more separate components or as one or more logic components, e.g. first through third logic 306-312, such as on an FPGA that may include a memory or reconfigurable component to store logic and processing component to execute the stored logic, or as computer program logic, stored in the memory 302, or other non-transitory computer readable medium, and executable by a processor 304, such as the processor 202 and memory 204 described below with respect to FIG. 2, to cause the processor 304 to, or otherwise be operative to, implement the above described operations.

In one embodiment, each of the financial instruments of the set comprise a futures contract available for trading on the electronic trading system only in whole number quantities.

In one embodiment, the set of financial instruments comprises one financial instrument.

In one embodiment, the at least one of the proportional quantities comprising other than a whole number value is less than one.

In one embodiment, the system 300 further includes an offset processor (not shown) coupled with the portfolio database 314, which may be implemented as fifth logic or other computer executable program code stored in the memory 302 and configured to be executed by the processor 304, or otherwise operative to offset, prior to the expiration date, the position in the single financial instrument based on creation of a counter-position thereto in association with the participant.

In one embodiment, the set of financial instruments is characterized by one or more financial characteristics which approximate one or more financial characteristics of another set of financial instruments comprising more financial instruments than the set of financial instruments.

In one embodiment, the at least one of the proportional quantities comprising other than a whole number value increases a precision with which the one or more financial characteristics of the set of financial instruments approximates the one or more characteristics of the other set of financial instruments.

In one embodiment, each of the financial instruments of the set of financial instruments is characterized by an expiration date, the expiration date of the single financial instrument being based on an earliest expiration date of any of the set of financial instruments.

In one embodiment, the instrument generator 308 further comprises, or is further coupled with, a quote processor (not shown), which may be implemented as sixth logic or other computer executable program code stored in the memory 302 and configured to be executed by the processor 304, or otherwise operative to: generate an electronic data message comprising a request for quote for the single financial instrument; transmit the electronic data message to a plurality of market participants via the network; receive an electronic response message from at least one of the plurality of market participants comprising data indicative of a quote to trade the single financial instrument; and transmit the electronic response message to the participant, the order for the quantity of the single financial instrument being received responsive thereto.

Figure 4:
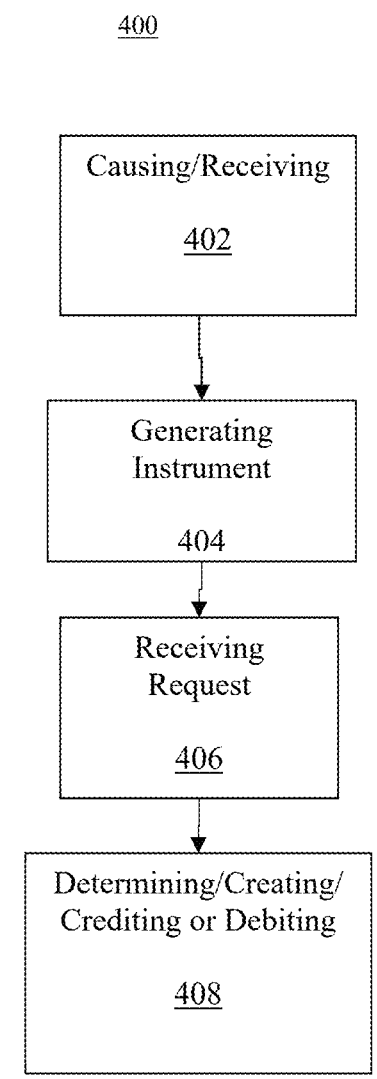
FIG. 4 depicts a flow chart showing the operation of the system of FIG. 3 according to some embodiments.

FIG. 4 illustrates an example flowchart 400 of the operation of the system 300 of FIG. 3. In one embodiment, the operation of the system 300 includes: causing, by a processor 304 coupled with the electronic trading system 100 via an electronic communications network 320/220, electronic presentation of a user interface on a display of a client device 150-158 coupled with the network 320, the user interface configured to receive, from a participant, a specification of a set of financial instruments, the specification identifying at least a proportional quantity of each financial instrument of the set relative to the other financial instruments of the set, at least one of the proportional quantities comprising other than a whole number value (Block 402); generating, by the processor 304 responsive to the receiving, a single financial instrument comprising an obligation to deliver, upon settlement, a position in each of the set of financial instruments, and enabling trading thereof in an electronic trading system 100, the single financial instrument specifying an expiration date upon which the electronic trading system will settle the single financial instrument (Block 404); receiving, by the processor 304 from the participant, a single electronic request message comprising an order for a quantity of the single financial instrument and, based thereon, matching the received order with a previously received order counter thereto received from another participant, and, based thereon, generating at least a position in the single financial instrument in association with the participant (Block 406); and determining, by the processor 304, that the expiration date of the single financial instrument has occurred and, based thereon, creating positions in association with the participant for a whole number quantity of each of the financial instruments of the set of financial instruments in accordance with the specification and the quantity of the single financial instrument, and based on the at least one of the proportional quantities comprising other than a whole number value and the quantity of the single financial instrument, one of crediting or debiting an account of the participant an amount based a fractional remainder of the at least one of the proportional quantities comprising other than a whole number value after creation of the position in the whole number quantity of the financial instrument associated therewith (Block 408).

In one embodiment, each of the financial instruments of the set comprise a futures contract available for trading on the electronic trading system only in whole number quantities.

In one embodiment, the set of financial instruments comprises one financial instrument.

In one embodiment, the at least one of the proportional quantities comprising other than a whole number value is less than one.

In one embodiment, the operation of the system 300 further includes: offsetting, prior to the expiration date, the position in the single financial instrument based on creation of a counter-position thereto in association with the participant.

In one embodiment, the set of financial instruments is characterized by one or more financial characteristics which approximate one or more financial characteristics of another set of financial instruments comprising more financial instruments than the set of financial instruments. In one embodiment, the at least one of the proportional quantities comprising other than a whole number value increases a precision with which the one or more financial characteristics of the set of financial instruments approximates the one or more characteristics of the other set of financial instruments.

In one embodiment, each of the financial instruments of the set of financial instruments is characterized by an expiration date, the expiration date of the single financial instrument being based on an earliest expiration date of any of the set of financial instruments.

In one embodiment, the operation of the system 300 further includes: generating, by the processor, an electronic data message comprising a request for quote for the single financial instrument; transmitting, by the processor, the electronic data message to a plurality of market participants via the network; receiving, by the processor, an electronic response message from at least one of the plurality of market participants comprising data indicative of a quote to trade the single financial instrument; and transmitting, by the processor, the electronic response message to the participant, the order for the quantity of the single financial instrument being received responsive thereto.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method which implements a user interface to an electronic trading system, having constrained data inputs, for automatically enabling unconstrained data inputs to be used with the electronic trading system so as to enable increased transaction processing precision without modifying the input constraints of the electronic trading system, the computer implemented method comprising:

causing, by a processor coupled with the electronic trading system via an electronic communications network, electronic presentation of the user interface on a display of a client device coupled with the network, the user interface configured to receive, from a participant, a specification of a set of financial instruments, the specification identifying a proportional quantity of each financial instrument of the set relative to the other financial instruments of the set, at least one of the proportional quantities comprising other than a whole number value which the electronic trading system will not accept as an input thereto;

generating, by the processor responsive to the receiving, a single financial instrument comprising an obligation to deliver, upon settlement, a position in each of the set of financial instruments, and enabling trading thereof in the electronic trading system, the single financial instrument specifying an expiration date upon which the electronic trading system will settle the single financial instrument;

receiving, by the processor from the participant, a single electronic request message comprising an order for a whole number quantity, which the electronic trading system will accept as an input thereto, of the single financial instrument and, based thereon, matching the received order with a previously received order counter thereto received from another participant, and, based thereon, generating at least a position in the single financial instrument in association with the participant; and determining, by the processor, that the expiration date of the single financial instrument has occurred and, based thereon, creating positions in association with the participant for a whole number quantity, which the electronic trading system will accept as an input thereto, of each of the financial instruments of the set of financial instruments in accordance with the specification and the quantity of the single financial instrument, and based on the at least one of the proportional quantities comprising other than a whole number value and the quantity of the single financial instrument, one of crediting or debiting an account of the participant an amount based on a fractional remainder of the at least one of the proportional quantities comprising other than a whole number value after creation of the position in the whole number quantity of the financial instrument associated therewith.

2. The computer implemented method of claim 1, wherein each of the financial instruments of the set comprise a futures contract available for trading on the electronic trading system only in whole number quantities.

3. The computer implemented method of claim 1, wherein the set of financial instruments comprises one financial instrument.

4. The computer implemented method of claim 1, wherein the at least one of the proportional quantities comprising other than a whole number value is less than one.

5. The computer implemented method of claim 1, further comprising:

offsetting, prior to the expiration date, the position in the single financial instrument based on creation of a counter-position thereto in association with the participant.

6. The computer implemented method of claim 1, wherein the set of financial instruments is characterized by one or more financial characteristics which approximate one or more financial characteristics of another set of financial instruments comprising more financial instruments than the set of financial instruments.

7. The computer implemented method of claim 6, wherein the at least one of the proportional quantities comprising other than a whole number value increases a precision with which the one or more financial characteristics of the set of financial instruments approximates the one or more characteristics of the other set of financial instruments.

8. The computer implemented method of claim 1, wherein each of the financial instruments of the set of financial instruments is characterized by an expiration date, the expiration date of the single financial instrument being based on an earliest expiration date of any of the set of financial instruments.

9. The computer implemented method of claim 1, wherein the generating further comprises:
   generating, by the processor, an electronic data message comprising a request for quote for the single financial instrument;
   transmitting, by the processor, the electronic data message to a plurality of market participants via the network;
   receiving, by the processor, an electronic response message from at least one of the plurality of market participants comprising data indicative of a quote to trade the single financial instrument; and
   transmitting, by the processor, the electronic response message to the participant, the order for the quantity of the single financial instrument being received responsive thereto.

10. A user interface system for an electronic trading system, having constrained data inputs, which implements a user interface for automatically enabling unconstrained data inputs to be used with the electronic trading system so as to enable increased transaction processing precision without modifying the input constraints of the electronic trading system, the user interface system comprising:
   a user interface generator configured to cause electronic presentation, via an electronic communications network, of the user interface on a display of a client device coupled with the network, the user interface configured to receive, from a participant, a specification of a set of financial instruments, the specification identifying a proportional quantity of each financial instrument of the set relative to the other financial instruments of the set, at least one of the proportional quantities comprising other than a whole number value which the electronic trading system will not accept as an input thereto;
   an instrument generator coupled with the user interface generator and, responsive to the receiving, configured to generate a single financial instrument comprising an obligation to deliver, upon settlement, a position in each of the set of financial instruments, and enable trading thereof in the electronic trading system, the single financial instrument specifying an expiration date upon which the electronic trading system will settle the single financial instrument;
   a request receiver coupled with the instrument generator and configured to receive, from the participant, a single electronic request message comprising an order for a whole number quantity, which the electronic trading system will accept as an input thereto, of the single financial instrument and, based thereon, match the received order with a previously received order counter thereto received from another participant, generate, based thereon, at least a position in the single financial instrument in association with the participant, and store, in a portfolio database coupled with the request receiver, data indicative of the generated position; and
   a settlement processor coupled with the portfolio database and configured to determine that the expiration date of the single financial instrument has occurred and, based thereon, create positions in association with the participant for a whole number quantity, which the electronic trading system will accept as an input thereto, of each of the financial instruments of the set of financial instruments in accordance with the specification and the quantity of the single financial instrument, and based on the at least one of the proportional quantities comprising other than a whole number value and the quantity of the single financial instrument, one of credit or debit an account of the participant an amount based on a fractional remainder of the at least one of the proportional quantities comprising other than a whole number value after creation of the position in the whole number quantity of the financial instrument associated therewith.

11. The system of claim 10, wherein each of the financial instruments of the set comprise a futures contract available for trading on the electronic trading system only in whole number quantities.

12. The system of claim 10, wherein the set of financial instruments comprises one financial instrument.

13. The system of claim 10, wherein the at least one of the proportional quantities comprising other than a whole number value is less than one.

14. The system of claim 10, further comprising:
   an offset processor coupled with the portfolio database and configured to offset, prior to the expiration date, the position in the single financial instrument based on creation of a counter-position thereto in association with the participant.

15. The system of claim 10, wherein the set of financial instruments is characterized by one or more financial characteristics which approximate one or more financial characteristics of another set of financial instruments comprising more financial instruments than the set of financial instruments.

16. The system of claim 15, wherein the at least one of the proportional quantities comprising other than a whole number value increases a precision with which the one or more financial characteristics of the set of financial instruments approximates the one or more characteristics of the other set of financial instruments.

17. The system of claim 10, wherein each of the financial instruments of the set of financial instruments is characterized by an expiration date, the expiration date of the single financial instrument being based on an earliest expiration date of any of the set of financial instruments.

18. The system of claim 10, wherein the generating further comprises a quote processor coupled with the instrument generator and configured to:
   generate an electronic data message comprising a request for quote for the single financial instrument;
   transmit the electronic data message to a plurality of market participants via the network;
   receive an electronic response message from at least one of the plurality of market participants comprising data indicative of a quote to trade the single financial instrument; and
   transmit the electronic response message to the participant, the order for the quantity of the single financial instrument being received responsive thereto.

19. A user interface system for an electronic trading system, having constrained data inputs, which implements a user interface for automatically enabling unconstrained data inputs to be used with the electronic trading system so as to enable increased transaction processing precision without modifying the input constraints of the electronic trading system, the user interface the system comprising:

a processor and a memory coupled therewith, the memory having computer readable instructions stored therein which, when executed by the processor, cause the processor to:

cause electronic presentation, via an electronic communications network, of the user interface on a display of a client device coupled with the network, the user interface configured to receive, from a participant, a specification of a set of financial instruments, the specification identifying a proportional quantity of each financial instrument of the set relative to the other financial instruments of the set, at least one of the proportional quantities comprising other than a whole number value which the electronic trading system will not accept as an input thereto;

generate, responsive to the receipt of the specification, a single financial instrument comprising an obligation to deliver, upon settlement, a position in each of the set of financial instruments, and enable trading thereof in the electronic trading system, the single financial instrument specifying an expiration date upon which the electronic trading system will settle the single financial instrument;

receive, from the participant, a single electronic request message comprising an order for a whole number quantity, which the electronic trading system will accept as an input thereto, of the single financial instrument and, based thereon, match the received order with a previously received order counter thereto received from another participant, generate, based thereon, at least a position in the single financial instrument in association with the participant, and store, in a portfolio database coupled with the request receiver, data indicative of the generated position; and determine that the expiration date of the single financial instrument has occurred and, based thereon, create positions in association with the participant for a whole number quantity, which the electronic trading system will accept as an input thereto, of each of the financial instruments of the set of financial instruments in accordance with the specification and the quantity of the single financial instrument, and based on the at least one of the proportional quantities comprising other than a whole number value and the quantity of the single financial instrument, one of credit or debit an account of the participant an amount based on a fractional remainder of the at least one of the proportional quantities comprising other than a whole number value after creation of the position in the whole number quantity of the financial instrument associated therewith.

20. The system of claim 19, wherein each of the financial instruments of the set comprise a futures contract available for trading on the electronic trading system only in whole number quantities.

\* \* \* \* \*